(12) United States Patent
Merkel et al.

(10) Patent No.: US 10,069,543 B2
(45) Date of Patent: Sep. 4, 2018

(54) MULTIPLE INPUT MULTIPLE OUTPUT, MIMO, BASEBAND APPARATUS

(71) Applicant: Rohde & Schwarz GmbH & Co. KG, München (DE)

(72) Inventors: Sandra Merkel, München (DE); William Powell, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/458,098

(22) Filed: Mar. 14, 2017

(65) Prior Publication Data

US 2017/0324454 A1 Nov. 9, 2017

(30) Foreign Application Priority Data

May 9, 2016 (EP) .................................... 16168740

(51) Int. Cl.
*H04B 7/02* (2018.01)
*H04B 7/0413* (2017.01)
*H04B 7/06* (2006.01)

(52) U.S. Cl.
CPC ......... *H04B 7/0413* (2013.01); *H04B 7/0617* (2013.01)

(58) Field of Classification Search
CPC .............................. H04B 7/0413; H04B 7/0617
USPC ........................................................ 375/267
See application file for complete search history.

(56) References Cited

U.S. PATENT DOCUMENTS

| 2010/0080165 | A1 | 4/2010 | Hossain et al. |
| 2013/0083681 | A1 | 4/2013 | Ebrahimi Tazeh Mahalleh et al. |
| 2013/0094547 | A1* | 4/2013 | Kang ..................... H04B 15/00 375/219 |
| 2015/0043476 | A1* | 2/2015 | Takeda .................. H04L 5/0053 370/329 |
| 2015/0124688 | A1* | 5/2015 | Xu ........................ H04B 7/0452 370/312 |
| 2015/0341802 | A1* | 11/2015 | Chiang ................. H04W 24/02 455/424 |
| 2015/0349912 | A1* | 12/2015 | Komi ..................... H04J 14/025 398/34 |
| 2016/0013855 | A1* | 1/2016 | Campos .................. H04B 7/12 370/343 |

OTHER PUBLICATIONS

Aleksandra Checko et al., "Cloud RAN for Mobile Networks—A Technology Overview", IEEE Communication Surveys & Tutorials, vol. 17 No. 1, First Quarter 2015, 22 pages.

* cited by examiner

*Primary Examiner* — Helene Tayong
(74) *Attorney, Agent, or Firm* — Westman, Champlin & Koehler, P.A.

(57) ABSTRACT

A Multiple Input Multiple Output, MIMO, baseband apparatus with a baseband signal interface adapted to transmit or receive baseband signals comprising data mapped by a mapping unit of said baseband apparatus to a number, N, of MIMO layers which are coupled by a MIMO layer coupling unit of said baseband apparatus to different remote radio heads connected to said baseband apparatus.

11 Claims, 5 Drawing Sheets

MULTIPLE INPUT MULTIPLE OUTPUT, MIMO, BASEBAND APPARATUS

CROSS-REFERENCE RELATED TO APPLICATION

This application is a non-provisional Application of European Patent Application No. 16168740.5, filed on May 9, 2016, in German, the contents of which are hereby incorporated by reference in its entirety.

FIELD OF THE INVENTION

The present patent application is related to a Multiple Input Multiple Output, MIMO, baseband apparatus. The present patent application is further related to a base station of a cellular communication network and a mobile user equipment.

TECHNICAL BACKGROUND

Communication networks use Multiple Input Multiple Output (MIMO) technology to achieve high data rates. MIMO systems use more than one transmit antenna to send a signal on the same frequency to more than one receive antenna. Whereas traditional cellular networks generally provide the best service under line-of-sight conditions, MIMO thrives under rich scattering conditions where signals bounce around the environment. Under rich scattering conditions, signals from different transmit antennas take multiple paths to reach the user equipment at different times. A MIMO system allows to multiply the capacity of a radio link using multiple transmit and receive antennas to exploit multipath propagation.

A MIMO system can employ spatial multiplexing. In spatial multiplexing, a high-rate signal is split into multiple lower-rate streams and each stream is transmitted from a different transmit antenna in the same frequency channel. If these signals arrive at the receive antenna array with sufficiently different spatial signatures and the receiver has accurate channel state information CSI it can separate these streams into parallel channels. Spatial multiplexing is a powerful technique for increasing channel capacity at higher signal-to-noise ratios SNR. The maximum number of spatial streams is limited by the lesser of the number of antennas at the transmitter or receiver. Spatial multiplexing can also be used for a simultaneous transmission to multiple receivers, known also as space-division multiple access or multi-user MIMO.

Figure 1:
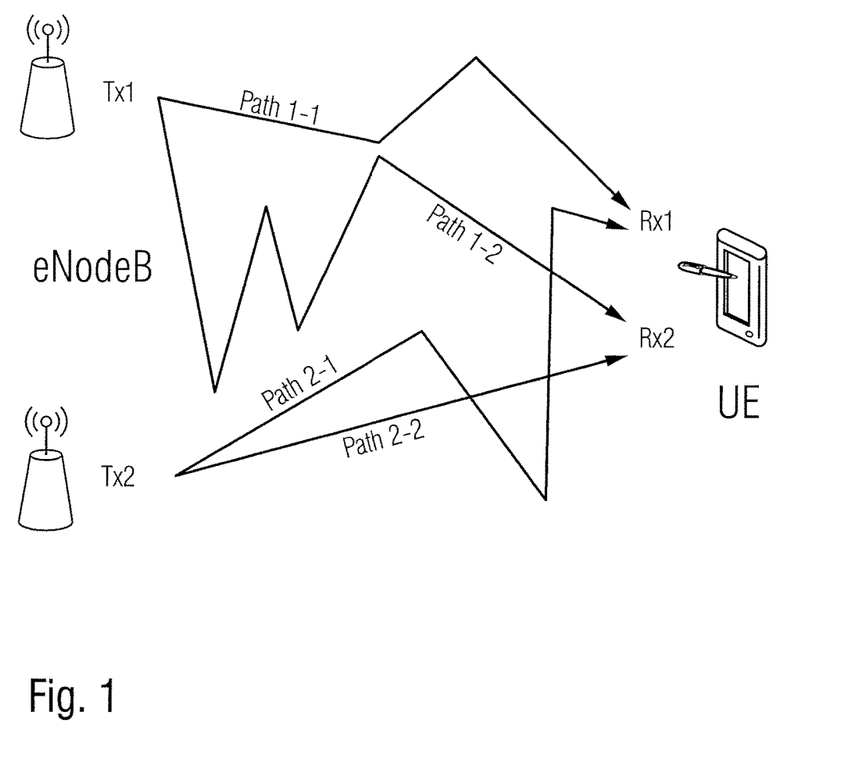
FIG. 1 illustrates schematically spatial multiplexing as employed by multiple input multiple output, MIMO, systems.

Spatial multiplexing works by creating separate data streams on multiple antennas. In conventional spatial multiplexing a baseband apparatus can divide a received high-rate data signal to be sent to a given user equipment on a given subchannel into multiple lower-rate data streams, called MIMO layers L. The number of MIMO layers is the same as the rank of the transmission. In the simplest case of spatial multiplexing, a rank two spatial multiplexing transmission on a 2×2 MIMO antenna configuration does transmit one layer L from each transmission antenna $T_x$ as illustrated in FIG. 1. In this case, the paths 1-1 and 1-2 in FIG. 1 represent layer L1, while paths 2-1 and 2-2 represent layer L2. Each layer L reaches each receiving antenna RX along a different path. The user equipment UE then reconstructs the layers L using information from both antennas.

Figure 2:
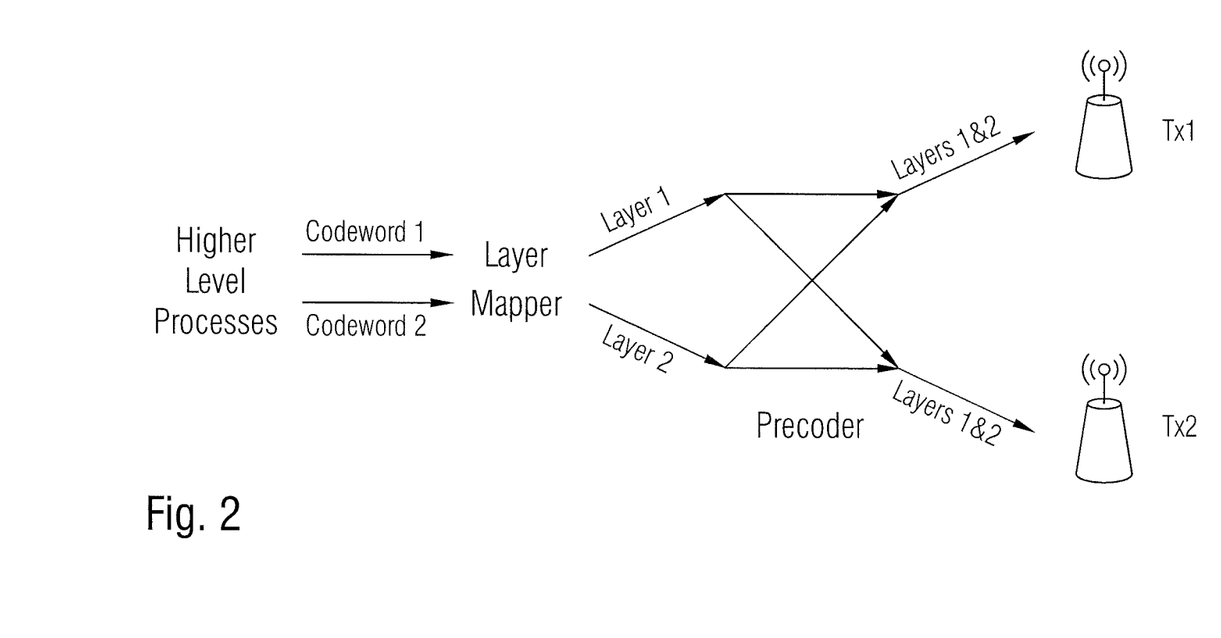
FIG. 2 shows a diagram for illustrating schematically MIMO layer mapping as performed in a conventional multiple input multiple output, MIMO, system.

Multiple layer transmissions either arrive from higher level processes in one or more codewords as illustrated in FIG. 2. In a conventional baseband apparatus, each codeword can then be mapped onto one or more layers L by a mapping unit.

However, conventional MIMO systems make not full use of the flexibility offered by spatial multiplexing providing a limited data transmission capacity.

Accordingly, there is the need to provide a MIMO baseband apparatus providing data transmission capacity using improved spatial multiplexing.

SUMMARY OF THE INVENTION

The invention provides according to a first aspect a multiple input multiple output baseband apparatus comprising: a baseband signal interface adapted to transmit or receive baseband signals comprising data mapped by a mapping unit of said baseband apparatus to a number of MIMO layers which are coupled by a MIMO layer coupling unit of said baseband apparatus to different remote radio heads connected to said baseband apparatus.

In a possible embodiment of the multiple input multiple output baseband apparatus according to the first aspect of the present invention, each remote radio head comprises at least one antenna array with at least one antenna connected via a frontend transceiver to a digital processing unit of said remote radio head.

In a further possible embodiment of the multiple input multiple output baseband apparatus according to the first aspect of the present invention, the baseband apparatus comprises for each remote radio head connected to said baseband apparatus a CPRI interface connected via an optical link to a CPRI interface of said remote radio head.

In a still further possible embodiment of the multiple input multiple output baseband apparatus according to the first aspect of the present invention, the MIMO layer coupling unit is adapted to switch MIMO layers output by said mapping unit to said remote radio heads in response to a control signal output by a MIMO layer coupling control unit of said baseband apparatus.

In a still further possible embodiment of the multiple input multiple output baseband apparatus according to the first aspect of the present invention, the MIMO layer coupling control unit is adapted to generate the control signal applied to said MIMO layer coupling unit depending on downlink parameters and/or uplink parameters of at least one wireless link provided between the remote radio heads of said baseband apparatus and a mobile user equipment device.

In a possible embodiment of the multiple input multiple output baseband apparatus according to the first aspect of the present invention, the remote radio heads using a radio transmission wavelength are spaced apart from each other by a distance of at least half the radio transmission wavelength.

In a further possible embodiment of the multiple input multiple output baseband apparatus according to the first aspect of the present invention, the digital processing unit of a remote radio head connected to the baseband apparatus comprises a beamforming controller.

In a possible embodiment of the multiple input multiple output baseband apparatus according to the first aspect of the present invention, the beamforming controller of the digital processing unit within a remote radio head is adapted to weight a magnitude and/or phase of antenna signals transmitted by the antennas of said remote radio head to provide a two- or three-dimensional beamforming.

In a further possible embodiment of the multiple input multiple output baseband apparatus according to the first aspect of the present invention, the MIMO layer coupling unit is adapted to couple for each remote radio head a subgroup of MIMO layers of said number of MIMO layers output by said mapping unit.

In a further possible embodiment of the multiple input multiple output baseband apparatus according to the first aspect of the present invention, each subgroup of MIMO layers selected for a remote radio head is supplied to a remote radio head precoding unit of said baseband apparatus associated to a remote radio head connected to said baseband apparatus, wherein said remote radio head precoding unit is adapted to perform a linear precoding of the received MIMO layers of the respective MIMO layer subgroup.

In a still further possible embodiment of the multiple input multiple output baseband apparatus according to the first aspect of the present invention, each remote radio head precoding unit of said baseband apparatus is adapted to multiply the MIMO layers of the MIMO layer subgroup applied to said remote radio head precoding unit with a precoding matrix.

In a further possible embodiment of the multiple input multiple output baseband apparatus according to the first aspect of the present invention, the precoded MIMO layers output by the remote radio head precoding unit are supplied to a corresponding cyclic prefix insertion unit adapted to insert a cyclic prefix into the received precoded MIMO layers and to output the precoded MIMO layers including the inserted cyclic prefixes to the CPRI interface of the respective remote radio head connected to said baseband apparatus via an optical link.

In a still further possible embodiment of the multiple input multiple output baseband apparatus according to the first aspect of the present invention, a distance between at least two remote radio heads connected to said baseband apparatus is adjustable.

The invention provides according to a second aspect a base station of a cellular communication network comprising a MIMO baseband apparatus, said MIMO baseband apparatus comprising: a baseband signal interface adapted to transmit or receive baseband signals comprising data mapped by a mapping unit of said baseband apparatus to a number of MIMO layers which are coupled by a MIMO layer coupling unit of said baseband apparatus to different remote radio heads connected to said baseband apparatus.

The invention provides according to a third aspect a mobile user equipment comprising a MIMO baseband apparatus, said MIMO baseband apparatus comprising: a baseband signal interface adapted to transmit or receive baseband signals comprising data mapped by a mapping unit of said baseband apparatus to a number of MIMO layers which are coupled by a MIMO layer coupling unit of said baseband apparatus to different remote radio heads connected to said baseband apparatus.

In a possible embodiment of the mobile user equipment according to the third aspect of the present invention, at least one remote radio head is connected via a wireless link to the baseband apparatus and integrated in a device wearable by a user of said user equipment device.

CONTENTS OF THE DRAWINGS

In the following, possible embodiments of the different aspects of the present invention are described in more detail with reference to the enclosed figures.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

DESCRIPTION OF EMBODIMENTS

Figure 3:
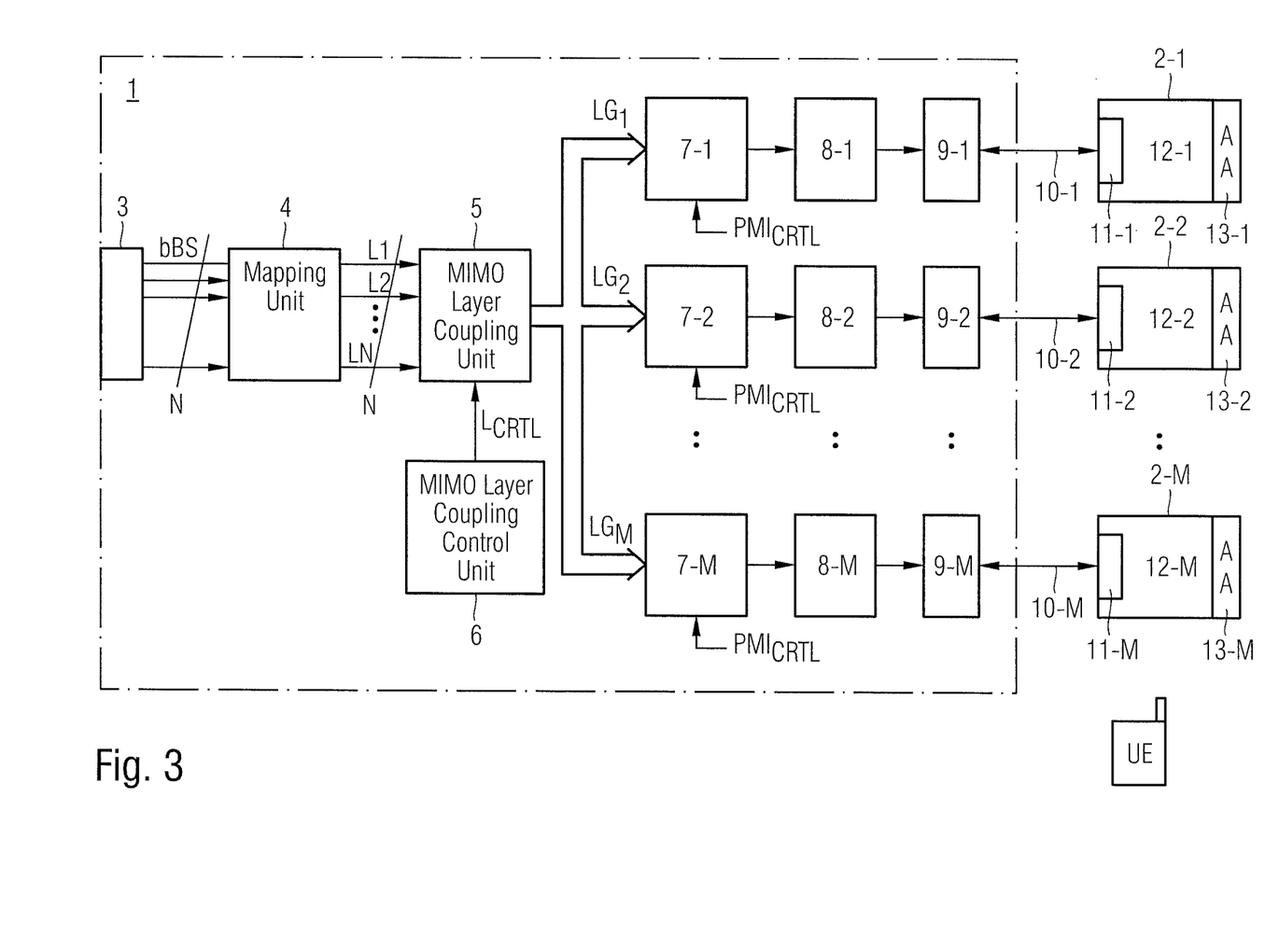
FIG. 3 shows a block diagram of a possible exemplary embodiment of a multiple input multiple output, MIMO, baseband apparatus according to the first aspect of the present invention.

FIG. 3 illustrates a possible exemplary embodiment of a multiple input multiple output, MIMO, baseband apparatus 1 according to the first aspect of the present invention. To the multiple input multiple output baseband apparatus 1, a number M of different remote radio heads RRHs 2-1, 2-2 . . . 2-M can be connected as illustrated in FIG. 3. The multiple input multiple output baseband apparatus 1 comprises at least one baseband signal interface 3 adapted to receive and/or to transmit baseband signals bBS. The baseband signals can comprise data which is mapped by a mapping unit 4 of said baseband apparatus 1 to a number N of MIMO layers L. The mapping unit 4 of the baseband apparatus 1 applies a number N of MIMO layers L to a MIMO layer coupling unit 5. The different MIMO layers L applied to the MIMO layer coupling unit 5 are coupled by the MIMO layer coupling unit 5 to different remote radio heads 2-$i$ connected to the baseband apparatus 1. In the embodiment illustrated in FIG. 3, the MIMO layer coupling unit 5 is adapted to switch MIMO layers L output by the mapping unit 4 to the remote radio heads in response to a control signal output by a MIMO layer coupling control unit 6 of the baseband apparatus 1. The MIMO layer coupling control unit 6 is adapted in a preferred embodiment to generate the control signal applied to the MIMO layer coupling unit 5 depending on parameters of at least one wireless link provided between the remote radio heads 2-$i$ of the baseband apparatus 1 and a mobile user equipment device UE. In a possible embodiment, the parameters comprise downlink, DL, and/or uplink, UL, parameters of the respective wireless link.

In a possible embodiment, the MIMO layer coupling unit 5 is adapted to couple individually for each remote radio head 2-$i$ a subgroup LG of MIMO layers L of said number N of MIMO layers L output by said mapping unit 4. A subgroup LG of MIMO layers L can comprise at least one MIMO layer L. Each subgroup of MIMO layers L selected for a remote radio head 2-$i$ is supplied in a possible embodiment as illustrated in FIG. 3 to a remote radio head precoding unit 7-1, 7-2 to 7-M wherein each remote radio head precoding unit 7-$i$ is associated to a corresponding remote radio head 2-*i* connected to the baseband apparatus 1. The number M of remote radio head precoding units 7-*i* corresponds to the number M of remote radio heads 2-*i* connectable to the baseband apparatus 1. Each remote radio head precoding unit 7-*i* is adapted to perform a linear precoding of the received MIMO layers L of the respective MIMO layer subgroup LG applied by the MIMO layer coupling unit 5 to the respective remote radio head precoding unit 7-*i*. Each remote radio head precoding unit 7-*i* is adapted in a possible embodiment to multiply the MIMO layers L of the MIMO layer subgroup LG applied to the remote radio head precoding unit 7-*i* with a corresponding precoding matrix PMI.

The precoded MIMO layers output by the remote radio head precoding unit 7-*i* are supplied to a corresponding cyclic prefix insertion unit 8-*i* connected to the output of the respective remote radio head precoding unit 7-*i* as illustrated in FIG. 3. The cyclic prefix insertion unit 8-*i* is adapted to insert a cyclic prefix CP into the received precoded MIMO layers of the respective MIMO layer subgroup LG-i and to output the precoded MIMO layers including the inserted cyclic prefixes to a CPRI interface 9-*i* of the respective remote radio head 2-*i* connected to the baseband apparatus 1 via an optical link 10-*i* as shown in FIG. 3. The baseband apparatus 1 comprises for each remote radio head 2-*i* connectable to the baseband apparatus 1 a CPRI interface 9-*i* connected via the optical link 10-*i* to a CPRI interface 11-*i* of the remote radio head 2-*i* as shown in FIG. 3. The remote radio head 2-*i* comprises a digital processing unit 12-*i* and at least one antenna array 13-*i* as shown in FIG. 3. The at least one antenna array 13-*i* of the remote radio head 2-*i* comprises at least one antenna connected via a frontend transceiver to the digital processing unit 12-*i* of the respective remote radio head 2-*i*. The digital processing unit 12-*i* of the remote radio head 2-*i* comprises in a preferred embodiment a beamforming controller. The beamforming controller of the digital processing unit 12-*i* is adapted to weight a magnitude and/or a phase of antenna signals transmitted by the antennas of the remote radio head 2-*i* to provide a beamforming. In a preferred embodiment, a three-dimensional beamforming is provided by the beamforming controller of the digital processing unit 12-*i*. The beamforming controller uses multiple antennas to control the direction of a wavefront by appropriately weighting the magnitude and phase of individual antenna signals. By beamforming, it is possible to provide a better coverage to specific areas around the remote radio heads. Because every single antenna in the antenna array 13-*i* can make a contribution to the steered signal an array gain can be achieved. Beamforming can also be performed in a possible embodiment in an adapted manner to a moving receiver.

In a possible embodiment, the antenna array 13-*i* of a remote radio unit 2-*i* comprises a two-dimensional rectangular antenna array, wherein the number of antenna ports for the two-dimensional array can be for instance 8, 12 or 16. In a possible embodiment, the beams can be controlled or steered in both azimuth and elevation dimensions, i.e. by controlling an azimuth angle and an elevation angle of the beam. In a possible embodiment, the beamforming controller of the digital processing unit 12-*i* of a remote radio head 2-*i* performs simultaneously elevation beamforming and/or azimuth beamforming.

In a possible embodiment, the remote radio heads 2-*i* using a radio transmission wavelength are spaced apart from each other by a distance D of at least half the radio transmission wavelength $\lambda/2$. In a preferred embodiment, the radio transmission heads 2-*i* can be spaced apart from each other by a distance of at least twice the radio transmission wavelength ($2\times\lambda$). In a further possible embodiment of the multiple input multiple output, MIMO, baseband apparatus 1 according to the first aspect of the present invention, the distance D between at least two remote radio heads connected to the baseband apparatus 1 can be adjustable. In a possible embodiment, the different remote radio heads 2-*i* can be connected via optical links 10-*i* each comprising at least one fiber cable to a corresponding common public radio interface CPRI 9-*i* of the baseband unit 1 as shown in FIG. 3. The CPRI offers a high-speed link with a high bandwidth such that the multiple remote radio units 2-*i* can be connected to a single baseband unit 1.

Figure 4:
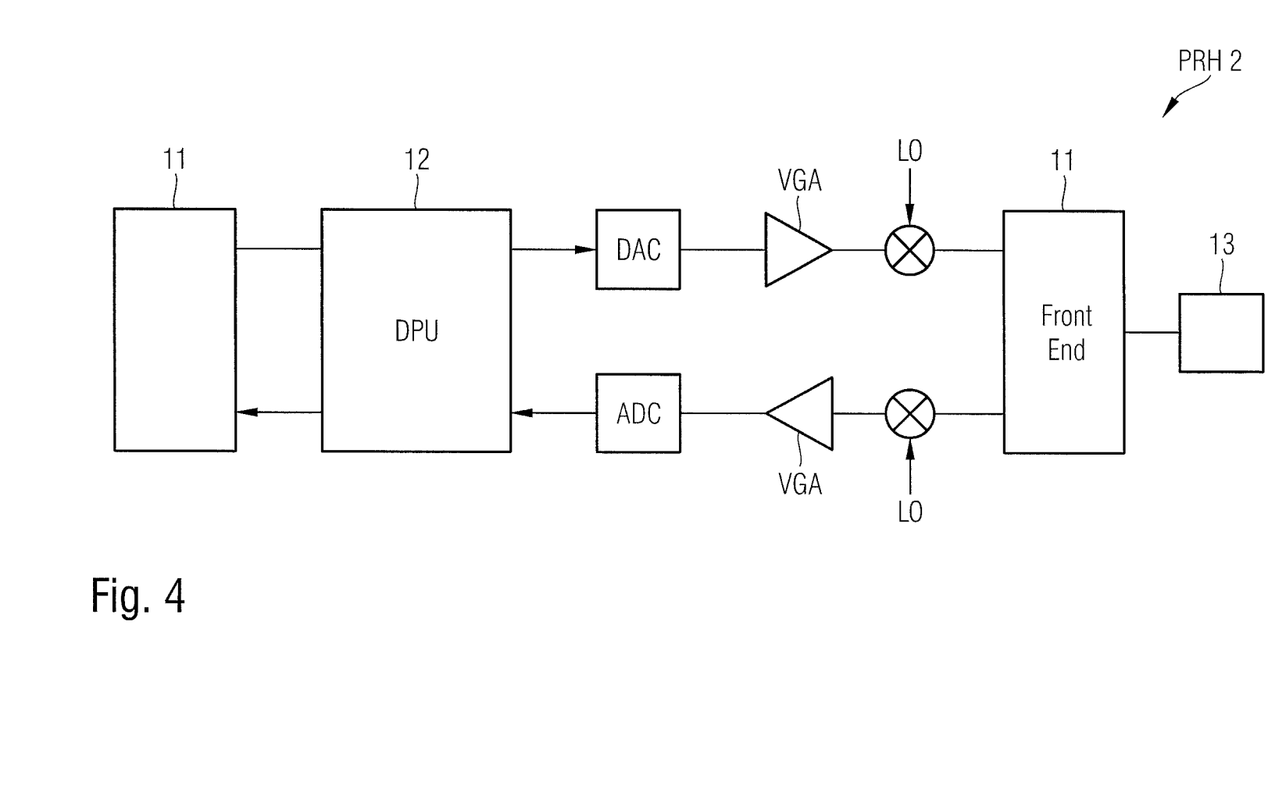
FIG. 4 shows a block diagram for illustrating a possible exemplary embodiment of a remote radio head connected to a multiple input multiple output, MIMO, baseband apparatus according to the first aspect of the present invention.

FIG. 4 shows a block diagram of a possible exemplary embodiment of a remote radio head 2-*i* which can be connected via a CPRI optical link 10-*i* to the baseband unit 1 according to the first aspect of the present invention. The antennas of the antenna array 13 can be connected via a frontend transceiver, a signal mixer and VGAs to the digital processing unit 12. The digital processing unit 12 can output a digital signal which is converted by a digital-to-analog converter DAC into an analog signal supplied to the frontend transceiver of the antenna array 13. The multiple input multiple output, MIMO, baseband apparatus 1 is adapted in a preferred embodiment to transmit signals via the antenna arrays 13-*i* of the different remote radio heads 2-*i* to the surrounding where different mobile user equipment devices UE can be located. The baseband apparatus 1 is further adapted to receive by means of the remote radio heads 2-*i* connected to the baseband apparatus 1 signals received by the antenna arrays 13-*i* of the remote radio heads 2-*i* from other devices, in particular user equipment devices UE. The different remote radio heads 2-*i* are located close to the respective antenna array. In a preferred embodiment, as shown in FIG. 4, the antenna array 13 is integrated in the respective remote radio head 2. The remote radio head 2 can be connected via a fiber optic baseband cable with DC power to a channel card of the baseband apparatus 1. The use of remote radio heads 2-*i* provides for a smaller footprint and optimized coverage. Further, the remote radio heads 2-*i* provide a high-power efficiency and sensitivity. Further, the use of remote radio heads 2-*i* provides the possibility of multi-mode operations and a flexible multi-carrier capability.

In a possible embodiment of the multiple input multiple output, MIMO, baseband apparatus 1 as illustrated in FIG. 3, the baseband apparatus 1 can be operated in different operation modes comprising an open-loop spatial multiplexing and a closed-loop spatial multiplexing mode. Open-loop and closed-loop modes differ in the level of detail and frequency with which channel conditions are reported by a user equipment device UE. In an open-loop operation, the baseband apparatus 1 receives only minimal information from the user equipment device, UE, in particular a rank indicator RI and a channel quality indicator CQI. The rank indicator RI indicates the number of layers that can be supported under the current channel conditions and modulation scheme. The channel quality indicator CQI is a summary of the channel conditions under the current transmission mode.

In a closed-loop operation, the user equipment device UE analyses the channel conditions for each transmission antenna including the multipath conditions. In this operation mode, the user equipment device, UE, provides a rank indicator RI as well as a precoding matrix indicator PMI which determines an optimum precoding matrix for the current channel conditions. Finally, the user equipment device, UE, can provide a channel quality indicator CQI given the rank indicator RI and the precoding matrix indicator PMI. This allows the baseband apparatus 1 to quickly and effectively adapt the transmission to the respective current channel conditions. In a possible embodiment, a receiver determines the channel input response from each transmitting antenna. The channel input responses can be determined by sequentially transmitting known reference signals from each transmitting antenna. While one transmitter antenna is sending a reference signal the other antennas are idle.

Spatial multiplexing as employed by the multiple input multiple output, MIMO, baseband apparatus 1 according to the first aspect of the present invention allows joined transmission of multiple data layers in the same time frequency resource in order to increase a system peak rate. In a closed-loop operation, a user equipment device UE can measure an instantaneous channel state information CSI and report to the baseband apparatus 1 a number of spatial layers that can be jointly transmitted (rank indicator RI), a selection from a predefined codebook of a precoding matrix PMI and/or a recommendation on a modulation encoding scheme that reflects the channel quality (channel quality indicator CQI).

In a possible embodiment of the multiple input multiple output, MIMO, baseband apparatus 1 according to the first aspect of the present invention, the baseband apparatus 1 can be used for coordinated multipoint transmission and reception. The baseband apparatus 1 can be integrated in a base station BS of a cellular communication network. In a possible embodiment, a coordinated multipoint transmission/reception CoMP improves coverage, cell edge throughput and system efficiency. When a user equipment device UE is for instance in a cell edge region, it may be able to receive signals from multiple cell sites and the transmission of the user equipment device UE may be received at multiple cell sites regardless of the system load. In coordinated multipoint transmission/reception, the signalling transmitted from the multiple cell sites is coordinated so that the downlink performance can be increased significantly. For the uplink, since the signal can be received by multiple cell sites, it is possible to take advantage of the multiple reception if the scheduling is coordinated from different cell sites, thus improving the uplink performance as well.

In a still further possible embodiment, baseband processing of multiple remote radio heads 2-$i$ can be carried out at a central unit so that a cooperative MIMO transmission by multiple geographically separated remote radio heads 2-$i$ is performed.

In a further possible embodiment, each remote radio head 2-$i$ comprises at least two antenna ports which are spaced apart from each other. Each remote radio head 2-$i$ can perform two- or three-dimensional beamforming of the antenna transmission characteristic. Each remote radio head 2-$i$ can provide the same physical resource by beamforming to at least two different mobile stations or user equipment devices UE. In a possible embodiment, the baseband apparatus 1 illustrated in FIG. 1, can be integrated in a base station BS of a communication network. In an alternative embodiment, the baseband apparatus 1 as illustrated in FIG. 3 can also be integrated in a mobile user equipment device UE.

Figure 5:
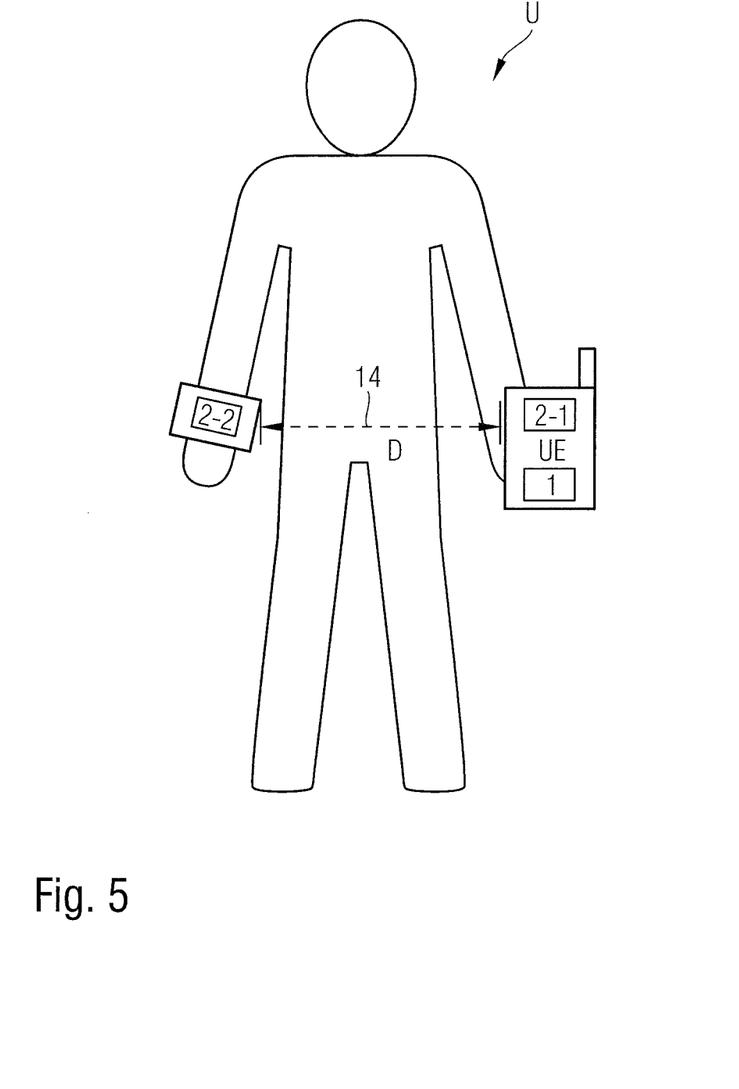
FIG. 5 shows schematically a possible exemplary embodiment of a mobile user equipment according to a further aspect of the present invention.

FIG. 5 shows a further possible embodiment of a mobile user equipment device UE comprising a MIMO baseband apparatus 1 according to the first aspect of the present invention. In the illustrated embodiment, the MIMO baseband apparatus 1 as shown in FIG. 3 is integrated in the user equipment device UE which can be formed for instance by a smartphone. The user equipment device UE comprises the MIMO baseband apparatus 1 and at least one remote radio head 2-1.

A user U carries the user equipment device UE with one hand and wears on the wrist of his other hand a wearable device comprising a further remote radio head 2-2 connected via a wireless link 14 to the baseband apparatus 1 integrated in the user equipment device UE. The additional remote radio head 2-2 can be carried by the user of the user equipment device UE in a wearable device such as a wristband to increase the uplink and/or downlink signal transmission quality. In the illustrated embodiment of FIG. 5, the first remote radio head 2-1 can be connected directly via a datalink to the baseband apparatus 1 integrated in the user equipment device UE. The additional remote radio head 2-2 can be connected via a Near Field Communication link NFC or, for instance, Bluetooth for further support of the baseband apparatus 1 integrated in the user equipment device UE. The distance D between the additional remote radio head 2-2 and the first remote radio head 2-1 can be adjusted by the user U by moving his arms to increase the signal quality. In a preferred embodiment, the distance D across the wireless interface 14 between the two different remote radio heads 2-1, 2-2 is at least half ($\lambda/2$) the wavelength $\lambda$ used for the transmission. In a preferred embodiment, the distance D between the two different remote radio heads 2-1, 2-2 is at least twice ($2\lambda$) of the used transmission wavelength $\lambda$.

The multiple input multiple output, MIMO, baseband apparatus 1 according to the first aspect of the present invention allows to steer different remote radio heads 2-$i$ by the same baseband apparatus. The antenna ports of a communication connection, e.g. 8×8 MIMO, can be connected to different physical remote radio heads 2-$i$ so that each MIMO layer L can be transmitted over a different RF transmission point. By using a multiple input multiple output, MIMO, baseband apparatus 1 according to the first aspect of the present invention, it is possible to reduce the correlation between the different antenna ports. Further, the flexibility of the system using remote radio heads 2-$i$ of different types is also increased. In a possible embodiment, the dynamic coordination of transmission and reception with multiple geographically separated MIMO baseband apparatuses 1 can be provided to enhance the overall system performance. In this embodiment, the different baseband apparatuses 1 are coordinated dynamically to provide a joined scheduling of transmitted signals as well as providing a joined processing of received signals. In this way, a user equipment device UE at the edge of a cellular communication network comprising a MIMO baseband apparatus 1 is able to be served by two or even more MIMO baseband apparatuses to improve signal reception and signal transmission as well as to increase the data throughput particularly under cell edge conditions. The use of different remote radio heads 2-$i$ connected to the baseband apparatus 1 allows for an improved coordinated scheduling and beamforming.

REFERENCE SIGNS

1 MIMO baseband apparatus
2 remote radio head RRH
3 baseband signal interface
4 mapping unit
5 MIMO layer coupling unit
6 MIMO layer coupling control unit
7 RRH precoding unit 8 cyclic prefix, CP, insertion unit
9 CPRI interface
10 optical link
11 CPRI interface
12 digital processing unit
13 antenna array
14 wireless link
UE user equipment device

What is claimed is:

1. A Multiple Input Multiple Output, MIMO, baseband apparatus comprising: a baseband signal interface adapted to transmit or receive baseband signals comprising data mapped by a mapping unit of said baseband apparatus to a number, N, of MIMO layers which are coupled by a MIMO layer coupling unit of said baseband apparatus to different remote radio heads connected to said baseband apparatus, wherein each MIMO layer is coupled by the MIMO layer coupling unit of said baseband apparatus to a different remote radio head;
   wherein said MIMO layer coupling unit is adapted to couple for each remote radio head a subgroup of MIMO layers of said number, N, of MIMO layers output by said mapping unit;
   wherein each subgroup of the MIMO layers selected for a remote radio head (RRH) is supplied to a RRH-precoding unit of said baseband apparatus associated to the remote radio head connected to said baseband apparatus, said RRH-precoding unit being adapted to perform a linear precoding of the received MIMO layers of the respective MIMO layer subgroup;
   wherein each RRH-precoding unit of said baseband apparatus is adapted to multiply the MIMO layers of the MIMO layer subgroup applied to said RRH-precoding unit with a precoding matrix; and
   wherein the precoded MIMO layers output by the RRH-precoding unit are supplied to a corresponding cyclic prefix insertion unit adapted to insert a cyclic prefix into the received precoded MIMO layers and to output the precoded MIMO layers including the inserted cyclic prefixes to a Common Public Radio Interface (CPRI) of the respective remote radio head connected to said baseband apparatus via an optical link.

2. The apparatus of claim 1,
   wherein each remote radio head comprises at least one antenna array with at least one antenna connected via a frontend transceiver to a digital processing unit of said remote radio head.

3. The apparatus of claim 1, wherein the baseband apparatus comprises for each remote radio head connected to said baseband apparatus the CPRI connected via the optical link to the CPRI of said remote radio head.

4. The apparatus of claim 1, wherein the MIMO layer coupling unit is adapted to switch MIMO layers output by said mapping unit to said remote radio heads in response to a control signal output by a MIMO layer coupling control unit of said baseband apparatus.

5. The apparatus of claim 1, wherein said MIMO layer coupling control unit is adapted to generate the control signal applied to said MIMO layer coupling unit depending on downlink, DL, parameters and/or uplink, UL, parameters of at least one wireless link provided between the remote radio heads of said baseband apparatus and a mobile user equipment, UE, device.

6. The apparatus of claim 1, wherein the remote radio heads using a radio transmission wavelength are spaced apart from each other by a distance of at least half the radio transmission wavelength.

7. The apparatus of claim 1, wherein the digital processing unit of the remote radio head connected to said baseband apparatus comprises a beamforming controller adapted to weight a magnitude and/or phase of antenna signals transmitted by the antennas of said remote radio head to provide a two- or three-dimensional beamforming.

8. The apparatus of claim 1, wherein a distance between at least two remote radio heads connected to said baseband apparatus is adjustable.

9. A base station of a cellular communication network, the base station comprising:
   a Multiple Input Multiple Output (MIMO) baseband apparatus, the MIMO baseband apparatus comprising a baseband signal interface adapted to transmit or receive baseband signals comprising data mapped by a mapping unit of said baseband apparatus to a number, N, of MIMO layers which are coupled by a MIMO layer coupling unit of said baseband apparatus to different remote radio heads connected to said baseband apparatus, wherein each MIMO layer is coupled by fee MIMO layer coupling unit of said baseband apparatus to a different remote head;
   wherein said MIMO layer coupling unit is adapted to couple for each remote radio head a subgroup of MIMO layers of said number, N, of MIMO layers output by said mapping unit;
   wherein each subgroup of the MIMO layers selected for a remote radio head (RRH) is supplied to a RRH-precoding unit of said baseband apparatus associated to the remote radio head connected to said baseband apparatus, said RRH-precoding unit being adapted to perform a linear precoding of the received MIMO layers of the respective MIMO layer subgroup;
   wherein each RRH-precoding unit of said baseband apparatus is adapted to multiply the MIMO layers of the MIMO layer subgroup applied to said RRH-precoding unit with a precoding matrix; and
   wherein the precoded MIMO layers output by the RRH-precoding unit are supplied to a corresponding cyclic prefix insertion unit adapted to insert a cyclic prefix into the received precoded MIMO layers and to output the precoded MIMO layers including the inserted cyclic prefixes to a Common Public Radio Interface (CPRI) of the respective remote radio head connected to said baseband apparatus via an optical link.

10. A mobile user equipment, UE, the mobile user equipment comprising:
   a Multiple Input Multiple Output (MIMO) baseband apparatus, the MIMO baseband apparatus comprising a baseband signal interface adapted to transmit or receive baseband signals comprising data mapped by a mapping unit of said baseband apparatus to a number, N, of MIMO layers which are coupled by a MIMO layer coupling unit of said baseband apparatus to different remote radio heads connected to said baseband apparatus, wherein each MIMO layer is coupled by the MIMO layer coupling unit of said baseband apparatus to a different remote head;
   wherein said MIMO layer coupling unit is adapted to couple for each remote radio head a subgroup of MIMO layers of said number, N, of MIMO layers output by said mapping unit;
   wherein each subgroup of the MIMO layers selected for a remote radio head (RRH) is supplied to a RRH-precoding unit of said baseband apparatus associated to the remote radio head connected to said baseband apparatus, said RRH-precoding unit being adapted to perform a linear precoding of the received MIMO layers of the respective MIMO layer subgroup;

wherein each RRH-precoding unit of said baseband apparatus is adapted to multiply the MIMO layers of the MIMO layer subgroup applied to said RRH-precoding unit with a precoding matrix; and wherein the precoded MIMO layers output by the RRH-precoding unit are supplied to a corresponding cyclic prefix insertion unit adapted to insert a cyclic prefix into the received precoded MIMO layers and to output the precoded MIMO layers including the inserted cyclic prefixes to a Common Public Radio Interface (CPRI) of the respective remote radio head connected to said baseband apparatus via an optical link.

11. The mobile user equipment of claim 10, wherein at least one remote radio head is connected via a wireless link to the baseband apparatus and integrated in a device wearable by a user of said user equipment, UE, device.

* * * * *